United States Patent
Arendoski

(10) Patent No.: US 6,908,979 B2
(45) Date of Patent: Jun. 21, 2005

(54) POLYURETHANE ELASTOMER GELS

(75) Inventor: Christopher A. Arendoski, Harrison Township, MI (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/715,647

(22) Filed: Nov. 18, 2003

(65) Prior Publication Data

US 2004/0147707 A1 Jul. 29, 2004

Related U.S. Application Data

(60) Provisional application No. 60/427,499, filed on Nov. 18, 2002.

(51) Int. Cl.$^7$ ............................................... C08G 18/65
(52) U.S. Cl. ............................ 528/49; 528/53; 528/58; 427/385.5
(58) Field of Search ......................... 427/385.5; 528/49, 528/53, 58

(56) References Cited

U.S. PATENT DOCUMENTS

| | | | |
|---|---|---|---|
| 3,846,364 A | | 11/1974 | Criddle et al. |
| 3,869,421 A | | 3/1975 | Sapp et al. |
| 3,875,086 A | | 4/1975 | Ramey et al. |
| 4,008,197 A | | 2/1977 | Brauer et al. |
| 4,155,892 A | * | 5/1979 | Emmons et al. ............ 524/507 |
| 4,168,258 A | | 9/1979 | Brauer et al. |
| 4,171,998 A | | 10/1979 | Brauer et al. |
| 4,176,239 A | | 11/1979 | Brauer et al. |
| RE30,321 E | | 7/1980 | Brauer et al. |
| 4,231,986 A | | 11/1980 | Brauer et al. |
| 4,281,210 A | | 7/1981 | Brauer et al. |
| 4,355,130 A | | 10/1982 | Heinze |
| 4,375,521 A | | 3/1983 | Arnold |
| 4,444,975 A | * | 4/1984 | Pokorny ...................... 528/49 |
| 4,533,598 A | | 8/1985 | Downey et al. |
| 4,596,743 A | | 6/1986 | Brauer et al. |
| 4,666,968 A | | 5/1987 | Downey et al. |
| 4,666,969 A | | 5/1987 | Brauer et al. |
| 4,705,723 A | | 11/1987 | Brauer et al. |
| 4,705,724 A | | 11/1987 | Downey et al. |
| RE33,354 E | | 9/1990 | Downey et al. |
| RE33,392 E | | 10/1990 | Brauer et al. |
| RE33,754 E | | 11/1991 | Brauer et al. |
| RE33,755 E | | 11/1991 | Downey et al. |
| RE33,761 E | | 12/1991 | Brauer et al. |
| 6,540,867 B1 | * | 4/2003 | Cochran ..................... 156/286 |

FOREIGN PATENT DOCUMENTS

| | | |
|---|---|---|
| JP | 7324161 | 12/1995 |
| WO | WO 01/57104 | 8/2001 |

* cited by examiner

*Primary Examiner*—Rachel Gorr
(74) *Attorney, Agent, or Firm*—Nicole Graham

(57) ABSTRACT

Polyurethane gels, a reaction system for preparing the gels, and a process for producing polyurethane gels. The reaction system comprises a polyisocyanate composition and an isocyanate-reactive composition comprising a relatively high molecular weight mono-ol and a relatively low molecular weight polyol having a nominal isocyanate-reactive functionality of at least 3. The gels do not require the use of plasticizers. The reaction system and process offer a surprising combination of long working time and rapid cure.

12 Claims, No Drawings

POLYURETHANE ELASTOMER GELS

CROSS-REFERENCE TO RELATED APPLICATIONS

This application claims priority to U.S. Provisional Application No. 60/427,499, filed Nov. 18, 2002.

FIELD OF THE INVENTION

The invention relates to elastomeric polyurethane gels, a process for making the gels, and a mixing activated reaction system for preparing the gels.

BACKGROUND OF THE INVENTION

Soft gels derived from a polymer containing a plurality of urethane linkages (a polyurethane) and a high level of plasticizer are well known in the art. Such gels have been used as potting compositions for electrical and telecommunications equipment, as energy absorbing material, as cushioning materials, and in many related applications. Further examples of specific applications of such materials include shoe inserts (such as arch supports), bicycle seat cushions, computer mouse pads, ergonomic elbow and wrist supports, helmet linings, and the like. Cushioning and ergonomic applications represent a growth area for these gel materials because these materials can be formulated to a consistency very similar to human fat. Such a consistency is ideal for supporting human body members that come into prolonged contact with an otherwise hard surface, such as the edge of a computer keyboard or the core of a bicycle seat. For similar reasons, these gels are finding a range of applications in medical applications and in items of personal protective equipment.

Highly plasticized gels have viscoelastic properties well suited to impact protection. The soft gels are generally solid gels, but are sometimes foamed to a modest degree to produce microcellular soft elastomers. The polyurethane gels are often, although not always, used behind a layer of fabric or an elastomeric film material. They are sometimes completely encapsulated by one or more such flexible facing (or backing) materials. Sometimes these encapsulated polyurethane gels are not solid, but instead may be flowable (albeit highly viscous) liquids. In this special situation, the encapsulating structures retain the gel in place.

Polyurethane gels are typically formed from the reaction of a polyfunctional organic isocyanate with a polyfunctional isocyanate reactive material in the presence of a non-volatile inert liquid. The polyurethane component of the gel is typically crosslinked (thermoset) and the isocyanate reactive material contributes flexibility. The polyurethane component of the gel, under the most preferred circumstances, couples to the non-volatile organic liquid by secondary bonding forces, such as hydrogen bonding and Van Der Waals interactions, in order to form a completely compatible plasticized gel in which the non-volatile liquid component(s) are bound and do not migrate or exude during use. The isocyanate reactive materials typically consist predominantly (on a weight basis) of flexible polyols known in the art. These polyols have equivalent weights greater than 500, typically about 1000 or greater, and nominal isocyanate reactive group functionalities of 2 to 4. The isocyanate reactive materials commonly used are polyether or polyester polyols. Aliphatic polyethers based on propylene oxide, sometimes in combination with ethylene oxide, are highly preferred. Nominal diols and triols are particularly preferred in the conventional gel systems, and mixtures of these are sometimes used. The polyols contain predominantly primary or secondary hydroxyl groups or combinations thereof. Typical gel formulations may also contain relatively low levels of low molecular weight chain extenders and/or crosslinkers known in the art. Examples of typical polyisocyanates used in making polyurethane gels include both aromatic and aliphatic polyfunctional isocyanates. The isocyanates of the MDI and TDI series are very widely used.

The loading of the non-volatile inert liquid in polyurethane gels is typically quite high. It is almost always higher than 10% by weight of the total gel composition, and is typically higher than 30% by weight of the total gel composition. Plasticizer loadings of greater than 50% of the total composition are well known. Plasticizers (typically inert, non-volatile liquids) that have been used in the past in preparing polyurethane gels include phthalate plasticizers (such as DIOP), vegetable oils, mineral oils, liquid resins such as polybutene resins, other kinds of ether and ester containing liquids, mixtures of these, and the like.

One of the oldest and most serious problems encountered in formulating polyurethane gel systems with high plasticizer loadings is overcoming the tendency of the plasticizer to separate, or migrate, out of the gel onto the surface thereof. Such migration, if severe enough, degrades the gel-like properties of the material over time. It can also create problems with staining due to the presence of excessive amounts of oily liquid on the surface of the gel. Many techniques have been used in the past to increase the compatibility of the plasticizer with the polyurethane in the gel. These techniques have included the use of special mixtures of plasticizers, such as mixtures of oils and phthalate plasticizers. The ester containing phthalate plasticizers are sometimes called "coupling agents" because they are believed to be capable of improving the compatibility of oils, such as mineral and vegetable oils, with the polyurethane component of the gel. It has been observed that certain ester containing plasticizers, particularly the popular phthalate plasticizers, can cause reduced cure rates in the reactive polyurethane portion of the gel formulation. The reasons for this retardation of cure rates is not altogether clear, but may be related to the presence of traces of acid in the ester based plasticizers. Complete elimination of all residual acidic species in ester containing plasticizers is very difficult and expensive. As a result of the retarding effect of these prior art plasticizers, higher loadings of urethane catalyst must be used. This adds to the cost of the system, and it would therefore be desirable not to have to add extra catalyst.

Petroleum based oils with a high aromatic content tend to have good compatibility in polyurethane gels and with the chemical precursors thereof (especially isocyanates). Unfortunately, most of these aromatic oils have serious issues regarding toxicity. To be sold in the United States, such oils must typically carry a cancer suspect agent warning. Inclusion of such oils into polyurethane gels is therefore problematic from a safety standpoint, especially if the gels are likely to come into contact, directly or indirectly, with people. Such is likely to be the case in many of the growth applications of polyurethane gels that were noted above. It should also be noted in this context that phthalate type plasticizers have come under recent scrutiny for possible toxic hazards. Therefore, it would be desirable not to have to use phthalate plasticizers.

There is accordingly a strong need in the industry for polyurethane based gel systems that do not contain plasticizing agents that exude from the gel, migrate, cause staining or odors, cause cure problems, and/or require a cancer suspect label or any other serious toxicity warnings. There are ongoing efforts to develop better plasticizers that meet the foregoing requirements. However, a better approach to meeting the needs of the industry is to develop a polyurethane gel system that eliminates the use of plasticizers entirely, or at least reduces the amounts required.

The prior art contains several references to the use of mono-ols as ingredients in elastomeric gel formulations or viscoelastic foams used in combination with polyols. Varying degrees of success have been reported with this strategy. However, the mono-ol based polyurethane gel formulations as a class tend to exhibit slow cure and may therefore be difficult to process. Gel formulations with high plasticizer levels tend to exhibit this problem as well.

The ideal reaction profile for a polyurethane gel formulation has a long gel time (or working time) and a short cure time. These requirements tend to be very difficult to satisfy simultaneously. Therefore, there is a need in the industry for a reaction system that is suitable for the preparation of elastomeric polyurethane gels without high levels of additive plasticizers, while offering a combination of both a long working time and fast cure.

SUMMARY OF THE INVENTION

In one embodiment, the invention relates to a mixing activated chemical reaction system for the production of elastic polyurethane gels comprising:
  a. an isocyanate-reactive composition comprising:
    i. greater than 75% by weight of an isocyanate-reactive organic mono-ol having a molecular weight of 1000 or greater, and
    ii. from greater than 1 to less than 10% by weight of an organic crosslinker having a nominal isocyanate-reactive group functionality of 3 or greater and an equivalent weight per isocyanate-reactive functional group of less than 150; and
  b. an organic polyisocyanate composition,
wherein the ratio of isocyanate groups to isocyanate-reactive groups in the reaction system is between 0.70 and 1.30 and the reaction system is essentially free of isocyanate-reactive monomers or oligomers other than those present in the isocyanate-reactive composition. The percentages by weight of the mono-ol and the crosslinker are determined relative to the total weight of the isocyanate-reactive composition.

In a preferred embodiment, the organic crosslinker has a molecular weight of less than 500. In another preferred embodiment, the organic crosslinker has a nominal functionality of from 3 to 8, more preferably between greater than 3 and 6, still more preferably from 4 to 5, and most preferably 4. In still another highly preferred embodiment, the organic crosslinker is essentially free of isocyanate-reactive groups other than primary or secondary aliphatically bound hydroxyl groups. In yet another highly preferred embodiment, the organic crosslinker contains at least one tertiary amine group per molecule.

In a particularly preferred embodiment, the organic mono-ol is essentially free of isocyanate-reactive groups other than organically bound primary or secondary hydroxyl groups and has a molecular weight of 1500 or greater. In another particularly preferred embodiment, the organic mono-ol is essentially free of isocyanate-reactive groups other than aliphatically bound primary or secondary hydroxyl groups and has a molecular weight of from greater than 1500 up to about 3000.

In yet another highly preferred embodiment, the reaction system contains at least one catalyst that is different from a(i) and a(ii). In a particularly preferred embodiment, the reaction system contains a combination of a fatty tertiary amine catalyst and an organotin catalyst.

In another embodiment, the invention relates to a process for preparing elastic polyurethane gels from the mixing activated reaction system. In a particularly preferred embodiment, the reaction system is formulated into just two liquid chemical precursor streams that are converted into an elastic polyurethane gel by mixing.

In another embodiment, the invention relates to elastic polyurethane gels prepared from the mixing activated reaction system. In a particularly preferred embodiment, the elastic polyurethane gels are essentially free of additive plasticizers.

DETAILED DESCRIPTION OF THE INVENTION

A mixing activated reaction system for the preparation of polyurethane elastic gels is described. The reaction system comprises an organic isocyanate-reactive composition and an organic polyisocyanate composition. The organic isocyanate-reactive composition comprises an organic mono-ol having a molecular weight of 1000 or greater and a relatively low molecular weight organic crosslinker which has a nominal functionality of at least 3 isocyanate-reactive functional groups per molecule and an equivalent weight per isocyanate reactive functional group of less than 150. The mono-ol comprises greater than 75% of the total weight of the isocyanate-reactive composition, preferably greater than 80%, more preferably greater than 85%, still more preferably at least 90%, yet more preferably greater than 90%, and most preferably greater than 92% of the total weight of the isocyanate-reactive composition. The crosslinker comprises from greater than 1 to less than 10% of the total weight of the isocyanate reactive composition. More preferably, the crosslinker comprises greater than 1.5% but less than 8%, still more preferably greater than 1.7% to less than 6%, yet more preferably greater than 2% to less than 5%, and most preferably greater than 2.5% to less than 4% of the total weight of the isocyanate-reactive composition. The percentages by weight of these ingredients are measured relative to the total isocyanate-reactive composition. The isocyanate-reactive composition may optionally contain other isocyanate reactive species different from either the mono-ol or the crosslinker, provided that the amounts by weight of the mono-ol and the crosslinker in the total isocyanate-reactive composition are as described above. The isocyanate-reactive composition may, for example, optionally contain polyols known in the art and/or water as a chemical foaming agent. If water is present in the isocyanate-reactive composition, it is preferably present at a level less than 5% by weight of the total weight of the isocyanate-reactive composition, more preferably less than 2.5%, still more preferably less than 2%, yet more preferably less than 1.5%, even more preferably less than 1%, and most preferably less than 0.5%. In a preferred embodiment, the isocyanate-reactive composition is essentially free of isocyanate-reactive species other than the mono-ol and the crosslinker.

The term "isocyanate-reactive species" as used herein encompasses discrete isocyanate-reactive molecular entities such as monomers or oligomers bearing isocyanate-reactive functional groups, but does not encompass insoluble solids used as optional fillers or reinforcements or facing materials that might also contain isocyanate-reactive functional groups. Such optional insoluble solid fillers, reinforcements, and facing materials are not considered to be part of either the isocyanate component or the isocyanate-reactive component of the reaction system. The use of such optional solid fillers, reinforcing materials, and facings is well understood in the art. Those skilled in the art will immediately recognize these items as distinct from the polymer-forming reaction system. The optional facings may, for example, include optional plastic or fabric encapsulation membranes that are used to encapsulate the final elastic gel prepared from the reaction system. The reaction system is essentially free of isocyanate-reactive species (other than the optional solid fillers, reinforcing materials, and facing materials) beyond those contained in the isocyanate-reactive composition described herein.

The term "polyurethane" will be understood to encompass polymers that contain a plurality of urethane linkages. These polymers may optionally also contain other kinds of chemical linkages formed from the reactions of polyisocyanates, including but not limited to urea linkages, isocyanurate linkages, oxazolidone linkages, biuret linkages, allophanate linkages, combinations of these, and the like.

Unless specifically stated otherwise, the terms molecular weight, equivalent weight, and functionality will be understood herein to be number averaged for polymeric or oligomeric molecular species (such as, for example, polyether or polyester polyols and mono-ols), or for mixtures of pure compounds in the same ingredient category (i.e. mixtures of polyisocyanates). The terms molecular weight, equivalent weight, and functionality will be understood by those skilled in the art to be absolute for pure compounds unless specifically stated otherwise.

The organic mono-ol in the isocyanate-reactive composition preferably has a molecular weight of 1000 or greater, but more preferably has a molecular weight of 1500 or greater, still more preferably greater than 1500, yet more preferably from greater than 1500 to less than 3000, even more preferably from 1600 to less than 2500, and most preferably from greater than 1600 to less than 2000. The organic mono-ol preferably contains only one isocyanate-reactive functional group per molecule. This functional group is an organically bound hydroxyl group, which is capable of forming urethane linkages when reacted with organic polyisocyanates. The organic mono-ol preferably contains a plurality of ether and/or ester linkages. The organic mono-ol is most preferably a polyoxyalkylene based mono-ol having an aliphatically bound primary or secondary hydroxyl group as the sole isocyanate-reactive group. Linear polyether based mono-ols having a terminal primary or secondary aliphatically bound —OH group are particularly preferred. Primary aliphatic —OH groups are most preferred.

The polyether backbone of the preferred polyoxyalkylene mono-ol is based predominantly on alkylene oxides selected from the group consisting of ethylene oxide, propylene oxide, and combinations of these. More preferably still, the polyether backbone of the polyoxyalkylene mono-ol is essentially free of alkylene oxides other than ethylene oxide or propylene oxide. A particularly preferred class of polyoxyalkylene mono-ols contains both oxyethylene and oxypropylene units in a weight ratio of from 10:90 to 90:10, more preferably from 25:75 to 75:25, still more preferably from 60:40 to 40:60, and most preferably from 55:45 to 45:55. The different alkylene oxides in the organic mono-ol backbone chain may be arranged randomly, or in blocks, or a combination of both. In an especially preferred embodiment, the oxyethylene and oxypropylene units together constitute most of the molecular weight of the organic mono-ol. The organic mono-ol may optionally contain aromatic rings, but is most preferably free of such rings. A non-limiting example of an especially preferred organic mono-ol is a polyoxypropylene-polyoxyethylene mono-ol having a number averaged molecular weight of about 1800 and a weight ratio of ethylene oxide to propylene oxide in its structure of about 50:50. This mono-ol is free of alkylene oxide units other than ethylene oxide (EO) or propylene oxide (PO). The EO and PO together make up most of the molecular weight of this molecule. Mixtures of organic mono-ols may of course be used as the organic mono-ol in the reaction system. If a mixture of organic mono-ols is used, it is preferred that all the organic mono-ols in the mixture should each individually conform to the specifications described above.

The isocyanate-reactive composition further comprises a crosslinker. The crosslinker preferably has a lower molecular weight than the mono-ol and nominally contains at least three isocyanate reactive groups per molecule (i.e. it has a nominal functionality of at least 3). In preferred embodiments, the crosslinker is a compound that has a molecular weight of less than 500, more preferably less than 400. In still more highly preferred embodiments, the crosslinker has a molecular weight between 200 and 350, yet more preferably from greater than 225 to less than 300. The crosslinker preferably has an equivalent weight per isocyanate-reactive functional group of less than 150, more preferably less than 125, still more preferably less than 100, yet more preferably from 60 to 90, and most preferably from greater than 65 to less than 80. The crosslinker is preferably free of aromatic rings. The nominal functionality of the crosslinker is preferably from 3 to 8.

The term "nominal functionality" of an isocyanate reactive molecule is to be understood to denote the expected functionality thereof based on the chemistry of its manufacture. This is usually a good approximation of the actual functionality, especially for low molecular weight isocyanate-reactive species, such as crosslinkers. The nominal functionality of a polyether polyol is, for example, equal to the functionality of the initiator used in its preparation. This terminology is widely used in the art, and would be immediately understood by one of ordinary skill.

The preferred crosslinkers are aliphatic polyols, polyamines, and olamines. If reactive amine groups are present in the molecule, they are preferably secondary amine groups. The most preferred crosslinkers are essentially free of isocyanate-reactive groups other than primary or secondary aliphatically bound hydroxyl groups. Primary organic hydroxyl groups are most preferred. The more preferred crosslinkers contain more primary organic —OH groups, on a molar basis, than secondary organic —OH groups. The total isocyanate-reactive functionality of the crosslinker is the sum of all the isocyanate-reactive groups that may be present therein, including the hydroxyl groups and any primary and secondary amine groups that may be present. It is preferred that the crosslinker should contain at least two isocyanate-reactive organic —OH groups per molecule. Highly preferred crosslinkers have a total nominal isocyanate-reactive group functionality of greater than 3 up to 6, yet more preferably from 4 to 5, and most preferably 4. An especially preferred class of crosslinkers includes those that contain at least one tertiary amine group per molecule. The tertiary amine containing crosslinkers are preferred due to their high reactivity towards isocyanates. The tertiary amine crosslinkers appear to offer an optimal combination of high cure rate and long working-time. Non-limiting examples of some preferred types of crosslinkers are low molecular weight alkylene oxide adducts of aliphatic amines. The preferred adducts are made from alkylene oxides selected from the group consisting of ethylene oxide, propylene oxide, and combinations of these. The most preferred adducts contain at least some ethylene oxide, most preferably at the ends of the molecule. This ethylene oxide termination (or capping) is preferred at least in part because it provides primary —OH groups. A specific example of an especially preferred crosslinker is JEFFOL® A-800 polyol. This product is available from Huntsman International LLC and is an adduct of ethylene diamine with both EO and PO. The EO is believed to be present as a cap. JEFFOL® A-800 polyol is a nominal tetrol that has an equivalent weight per —OH group of about 70 and a molecular weight of about 280. It is of course possible to use mixtures of crosslinkers. If a mixture is used, it is preferred that the individual components in the mixture each individually meet the specification on the crosslinker described herein.

The organic polyisocyanate composition of the reaction system preferably contains free organically bound isocyanate (—NCO) groups. The organic polyisocyanate composition preferably consists of organic polyisocyanates having a number averaged isocyanate (—NCO) functionality of from at least 1.8 to about 4.0. In practicing the more preferred embodiments, the number averaged isocyanate functionality of the polyisocyanate composition is preferably from 2.0 to about 3.0, more preferably from 2.3 to 2.9, and still more preferably 2.5 to 2.9. The expression "organic polyisocyanate" will be understood to encompass isocyanate molecular species having a plurality of organically bound free isocyanate (—NCO) groups. This definition includes organic diisocyanates, triisocyanates, higher functionality polyisocyanates, and mixtures thereof.

The organic polyisocyanates that may be used in the preferred embodiments include any of the aliphatic, cycloaliphatic, araliphatic, or aromatic polyisocyanates known to those skilled in the art. Especially preferred are those polyisocyanates that are liquid at 20° C. Examples of suitable polyisocyanates include, but are not limited to 1,6-hexamethylenediisocyanate, isophorone diisocyanate, 1,4-cyclohexane diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate (4,4'-MDI), 2,4'-diphenylmethane diisocyanate (2,4'-MDI), polymethylene polyphenylene polyisocyanates (crude, or polymeric, MDI), and 1,5-naphthalene diisocyanate. Mixtures of these polyisocyanates can also be used. Moreover, isocyanate-functional polyisocyanate variants, for example polyisocyanates that have been modified by the introduction of urethane, allophanate, urea, biuret, carbodiimide, uretonimine, isocyanurate, and/or oxazolidone residues can also be used. In general, aromatic polyisocyanates are more preferred for use. The most preferred aromatic polyisocyanates are 4,4'-MDI, 2,4'-MDI, polymeric MDI, MDI variants, and mixtures of these. Isocyanate terminated prepolymers may also be employed. Such prepolymers are generally prepared by reacting a molar excess of polymeric or pure polyisocyanate with one or more polyols. The polyols may include aminated polyols, imine or enamine modified polyols, polyether polyols, polyester polyols or polyamines. Pseudoprepolymers (also known as semiprepolymers or quasiprepolymers), which are mixtures of isocyanate terminated prepolymer and one or more monomeric polyisocyanates, may also be used. The use of prepolymers and especially pseudoprepolymers provides a method for modifying the mechanical properties of the elastic polyurethane gel and for modifying the processing of the precursor formulation (reaction system). The use of prepolymers, particularly pseudoprepolymers, is also a useful technique for control of the weight ratios of the reactive components of the foam formulation. Although the use of prepolymers is within the scope of the invention, the polyisocyanate composition used in the preferred embodiments is essentially free of prepolymers (or pseudoprepolymers).

Although it is within the scope of the invention to incorporate polyisocyanate species that are fully or partially blocked, it is much more preferable not to use any blocked isocyanate species. Free isocyanate (—NCO) groups are strongly preferred. Consequently, the polyisocyanate should be essentially free of blocked isocyanate groups.

The polyisocyanate composition suitable for use in the reaction system preferably has a free organically-bound isocyanate (—NCO) group content in the range of from 5 to 50% by weight, more preferably from 10 to 40% by weight, still more preferably from 15 to 35% by weight, yet more preferably from 20 to 33.6%, and most preferably from 25 to 33% by weight of the total polyisocyanate composition.

Commercially available polyisocyanates suitable for use as the polyisocyanate composition include the RUBINATE® brand polymeric isocyanates available from Huntsman International LLC. A specific example of a commercial polyisocyanate product suitable for use as the polyisocyanate composition is RUBINATE® TDI diisocyanate, which is an 80:20 mixture of 2,4-TDI and 2,2-TDI. This product is available from Huntsman International LLC. An example of an especially preferred polyisocyanate composition particularly suitable for use is RUBINATE® M polyisocyanate. This liquid isocyanate is of the polymeric MDI type and has a free isocyanate (—NCO) content of 31.5% by weight and a number averaged isocyanate group functionality of 2.7. This product is available from Huntsman International LLC. Another specific example of a preferred polyisocyanate composition suitable for use in certain embodiments is RUBINATE® 1850 polyisocyanate. This product, which is commercially available from Huntsman International, LLC, is an isocyanurate modified polymeric MDI product, which has a number averaged isocyanate group functionality of about 2.9 and has a free isocyanate (—NCO) group content of about 30.5% by weight.

The stoichiometry of reaction systems containing an organic polyisocyanate composition and a isocyanate-reactive composition is often expressed by a quantity known in the art as the Index. The Index of such reaction systems is simply the ratio of the total number of reactive isocyanate (—NCO) groups present to the total number of isocyanate-reactive groups (that can react with the isocyanate under the conditions employed in the processing of the reaction system). This quantity is often multiplied by 100 and expressed as a percent. Typical index values used in mixing activated gel forming reaction systems, including the reaction systems disclosed herein, range from about 0.70 to about 1.3. A more preferred index range for the reaction systems ranges from 0.8 to 1.2, still more preferably from 0.9 to 1.1, even more preferably from 0.95 to 1.05, and most preferably from 0.97 to 1.03 (i.e. 97% to 103% index).

The reaction systems preferably also contain one or more additional catalysts for polymer-forming reactions of polyisocyanates. The use of added catalysts is optional, but very strongly preferred. These preferably include catalysts for the reaction of isocyanates with alcohol groups (urethane catalysts) and for the reaction of isocyanates with water if water is present. The reaction may also optionally, but less preferably, contain catalysts for the trimerization of isocyanate groups. The optional catalysts are, most preferably, incorporated into the reaction system via admixture with the isocyanate-reactive component.

Catalysts for the polymer forming reactions of organic polyisocyanates are well known. The optional catalyst may consist of a single catalyst or a mixture of two or more catalysts. Some preferred catalysts include, but are not limited to, tertiary amines, tertiary amine acid salts, organic metal salts, covalently bound organometallic compounds, and combinations of these. Examples of preferred tertiary amine catalysts include, but are not limited to, triethylenediamine, N,N-dimethyl cyclohexylamine, bis-(dimethylamino)-diethyl ether, N-ethyl morpholine, N,N,N',N',N"-pentamethyl diethylenetriamine, N-benzyl dimethylamine, and aliphatic tertiary amine-containing amides of carboxylic acids, such as the amides of N,N-dimethyl aminopropylamine with stearic acid and/or oleic acid. Commercially available tertiary amine catalysts include the JEFFCAT® brand amines from Huntsman International LLC and the POLYCAT® and DABCO® brand amine catalysts, both available form Air Products and Chemicals Inc. Examples of suitable tertiary amine acid salt catalysts include those prepared by the at least partial neutralization of formic acid, acetic acid, 2-ethyl hexanoic acid, oleic acid, or oligomerized oleic acid with a tertiary amine such as triethylenediamine, or the like. These amine salt catalysts are sometimes referred to as "blocked amine catalysts", owing to delayed onset of catalytic activity that provides for improved convenience of resin dispensing. Examples of preferred organic metal salts for use as catalysts include potassium 2-ethyl hexanoate, potassium oleate, potassium acetate, potassium hydroxide, dibutyltin dilaurate, dibutyltin diacetate, and dibutyltin dioleate, and other organotin carboxylate catalysts. A specific example of an organotin carboxylate and amine based (mixed) catalyst composition is DABCO® DC-2 catalyst, which is commercially available from Air Products and Chemicals, Inc. Other metal-based catalysts that are suitable for use are zinc carboxylates, such as zinc stearate and zinc neodecanoate, and bismuth carboxylates. Further examples of useful catalysts suitable for use include amido amine compounds derived from the amidization reaction of N,N-dimethyl propanediamine with fatty carboxylic acids. A specific example of such a catalyst is BUSPERSE® 47 catalyst from Buckman Laboratories.

Mixtures of tertiary amine, amine acid salt, organometallic, and/or metal salt catalysts may be used. The use of mixed catalysts is well known to those skilled in the polymer forming chemistry of polyisocyanates and polyfunctional active hydrogen resins. It may sometimes be desirable, although it is generally less preferred, to include in the mixing activated chemical reaction system one or more catalysts for the trimerization of isocyanate groups. Examples of these include the alkali metal salts of carboxylic acids. Some specific examples of isocyanate trimerization (isocyanurate) catalysts include potassium 2-ethyl hexanoate, potassium oleate, potassium acetate, and potassium hydroxide. These are also effective for the catalysis of the reaction of polyisocyanates with active hydrogen compositions such as polyols and mono-ols. The levels of catalysts will vary considerably depending upon the needs of any given processing situation, as is well known in the art. However, the combined loading of all added (optional) catalysts in the gel forming reaction system rarely exceeds 5% by weight thereof, and more desirably is 3% or less.

In a particularly preferred embodiment, the reaction system contains an aliphatic fatty amine catalyst, most preferably in combination with an organotin catalyst. The fatty amine catalyst is preferably an aliphatic tertiary amine, free of isocyanate-reactive groups, which contains at least one individual alkyl or alkenyl group of greater than 7 carbon atoms. More preferably still, the fatty amine catalyst contains an individual alkyl or alkenyl group of greater than 10 carbons. Even more preferably, the fatty tertiary amine catalyst molecule contains an individual alkyl or alkenyl group of from greater than 10 to less than 30 carbons. A specific but non-limiting example of a preferred fatty amine catalyst is N,N-dimethyl cetylamine. The use of the fatty amine catalyst has been found to improve the surface cure of the polyurethane gel derived from the reaction system. It has further been found that the fatty amine catalyst is most effective when used in combination with an organotin catalyst, most preferably an organotin compound or complex that also contains at least one organosulfur group, such as a dialkyltin mercaptide compound. A specific but non-limiting example of a suitable organotin catalyst product for this purpose is FOMREZ®UL22 catalyst, available from Crompton Corporation. This proprietary organotin catalyst is believed by some to be a dibutyltin dimercaptide, although we do not wish to be bound to any theory. The weight ratio of the fatty tertiary amine catalyst to the organotin catalyst in this preferred catalyst composition is preferably in the range of from 10:1 to 1:1, but more preferably from 8:1 to 3:1, and still more preferably from 7:1 to 4:1. The overall loading by weight of the fatty tertiary amine catalyst in the total reaction system in this embodiment is from 0.5 to 4%, but more preferably from 0.6 to 3%, and most preferably from 0.7 to less than 2%. Optional catalysts are preferably introduced into the reaction system via pre-blending with one or more of the essential ingredients in the isocyanate-reactive composition.

Beyond the optional catalysts, the reaction system may optionally contain other additives known in the art of polyurethane gels. These other additives may include surfactants, such as silicone surfactants; fire retardants; smoke suppressants; pigments; dyes; antimicrobial agents; antistatic agents; fillers; reinforcements; coupling agents, such as organofunctional silanes; combinations of these; and the like. Highly preferred are optional additives that are soluble in the isocyanate-reactive and/or the polyisocyanate compositions that make up the reaction system at the use levels required. A highly desirable class of optional additives includes surfactants, especially the organosilicone surfactants, that may improve mixing of the components during the mixing activated polymerization process. These surfactants are very widely used and well known the polyurethanes art. Fire retardants may also be desirable in some gel applications. Soluble fire retardants are most preferred in the reaction system. Some preferred but non-limiting examples include triorganophosphate esters, such as trischloropropyl phosphate (TCPP) and triphenyl phosphate. It may also be desirable at times to employ physical blowing agents, such as one or more of the well-known hydrocarbon and fluorochemical blowing agents. Other optional blowing agents that might be used include chemical blowing agents of the type that decompose when heated to liberate a gas. Still other optional blowing agents include dissolved or dispersed atmospheric gases such as air, nitrogen, carbon dioxide, argon, or combinations of these gases. The most preferred reaction systems are, however, essentially free of any blowing agents.

It is also often necessary to use dyes or pigments. A non limiting example of a suitable pigment is titanium dioxide, which may be used as a dispersion in one of the liquid components of the reaction system.

Additive plasticizers, such as those well known in the art, may also be used if desired. However, one of the main advantages of the reaction systems is the fact that additive plasticizers are not required. When used at all, they may be used at relatively lower levels than in many prior art polyurethane gel forming reaction systems. The most preferred reaction systems are essentially free of additive plasticizers.

The combined loading of all the optional additives in the reaction system should preferably be less than 20% by weight of the total formulation, more preferably less than 15% by weight, still more preferably less than 10% by weight, and most preferably 5% by weight or less of the total reaction system weight. Optional additives other than the solid and insoluble fillers, reinforcements, and facing materials, which contain any isocyanate-reactive functionality should be accounted part of the isocyanate-reactive composition of the reaction system, such that the minimum amounts by weight of the crosslinker and mono-ol ingredients are always satisfied.

In another embodiment, the invention relates to a process for producing elastic polyurethane gels using the reaction systems described above. According to the process, the polyisocyanate composition, the isocyanate-reactive composition, and any optional additives in the reaction system are combined and mixed at a ratio consistent with the desired stoichiometry and final gel composition. The mixing of the reaction system initiates a polymerization reaction that produces an elastomeric gel. The mixing and reaction may be conducted at ambient temperatures. Temperature controlled conditions may also be used if desired. The mixing may be conducted by hand or in any suitable mixing apparatus known in the art.

In a particularly preferred embodiment, the reaction system is formulated into exactly two liquid components. Upon controlled mixing, these components produce a liquid reaction mixture that has a certain working time. The reaction mixture is preferably homogeneous, but need not be. In the preferred two component processing mode, the polyisocyanate composition generally serves as one component (typically called the A-component) and the isocyanate-reactive composition, admixed with any optional additives, serves as the second component (typically called the B-component). It is, however, within the scope of the invention to use other kinds of two component formulations. It may, for example, be possible to introduce some of the optional additives into the polyisocyanate component, provided that these are stable in the presence of isocyanate groups and do not cause self-reactions of the polyisocyanate. It may also be possible, although it is generally less preferred, to pre-react some of the essential isocyanate-reactive ingredients (i.e. the mono-ol or part thereof) into the polyisocyanate composition as a kind of isocyanate-terminated prepolymer. In the most preferred embodiments, the mono-ol and the crosslinker are all fully incorporated into the isocyanate-reactive component (B-component) of a two-component mixing activated formulation. It is of course also possible to use more than two reactive components in forming elastic polyurethane gels from the reaction system. The maximum number of possible reactive chemical streams that may be used is limited only by the imagination and by the available processing apparatus. Two component processing is generally the most practical, however. The reactive chemical streams used are preferably liquid under the conditions of mixing. They are preferably also liquid at ambient temperatures (20° C.). Formulation of liquid component streams is very well known in the polyurethanes art.

The reaction systems disclosed herein have unexpected and surprisingly been found to provide a combination of a long working time and fast cure. The reaction mixture formed by combining and mixing the components of the more preferred reaction system formulations at ambient temperature (20° C.) is a surprisingly low viscosity liquid, which is usually homogeneous in the absence of optional fillers. This liquid remains pourable and otherwise workable for from 1 to 5 minutes and sometimes longer, but cures to a solid polyurethane gel elastomer generally in from 5 to 20 minutes. The elastic gel and any articles prepared therewith are then generally usable at that point. The exact working times and cure times will, of course, vary considerably with the exact formulation of the reaction system used and the processing conditions employed. Particularly important factors include the level of crosslinker, the use and levels of optional catalysts, the initial temperatures of the reactive liquid chemical streams, and the temperature of the vessel (such as the mold) into which the liquid reaction mixture is poured. However, it has generally been observed that the working times provided by the reaction mixture are surprisingly long, considering the fact that a high functionality crosslinker is used and there are (in the most preferred embodiments) no high-molecular-weight low-functionality polyols (flexible polyols) or additive plasticizers present in the reaction system. The cure times provided by the preferred reaction systems have been observed to be consistently faster than for other gel forming reaction systems that are outside the scope of the invention, and especially those that also provide comparable working times. The combination of a relatively long working time (or pot life) combined with the relatively short cure time are major advantages of the reaction system and process. Another major advantage is the fact that additive plasticizers are not required. Even very soft, elastic, high-quality polyurethane gels may be easily prepared which are essentially free of these problematic additives.

In another embodiment, the invention relates to elastic polyurethane gels prepared from the reaction systems and to composite articles prepared with the gels. In a preferred embodiment, the elastic polyurethane gels are molded or incorporated into composite objects by molding. The gels may optionally be encapsulated in membranes, poured behind facing materials, such as fabric, rubber or plastic, cast onto backing materials, poured over porous reinforcing materials, or likewise adhered to other materials. The adhesion and shaping of these kinds of composite gel-containing articles can usually be carried out in a single operation. This is usually accomplished simply by preparing the liquid reaction mixture from the reaction system and then allowing the former to come into contact with another material, such as a facing material, and allowing it to cure. In a preferred embodiment, this simple operation is carried out with the aid of a molding means of some type. It is generally not necessary to use adhesives, other than the gel forming reaction mixture itself, in forming these elastic gel composite articles.

The following example is illustrative of the present invention, and is not intended to limit the scope of the invention in any way. Those of skill in the art should, in light of the present disclosure, appreciate that many changes can be made in the specific embodiments which are disclosed and still obtain a like or similar result without departing from the scope of the invention.

EXAMPLES

In the example that follows, all percentages are by weight relative to the indicated component unless otherwise indicated.

Example 1

A molded elastic polyurethane gel article was prepared by combining and mixing the following two component formulation at ambient temperature, and subsequently pouring the resulting liquid reaction mixture into a mold and allowing the mixture to cure. Both of the components described below are liquid at ambient temperature (20° C.):

A-Component: 100% by weight of RUBINATE® M isocyanate. (RUBINATE M isocyanate, which is available from Huntsman International LLC, is a liquid polyphenyl polymethylene polyisocyanate consisting essentially of a mixture of polyisocyanates of the MDI series, and characterized by having a number averaged isocyanate (—NCO) group functionality of about 2.7 and a concentration of free isocyanate (—NCO) groups of about 31.5% by weight.)

B-Component:
1. 94.0% by weight of JEFFOX® WL-660 polyol. (An n-butanol initiated polyoxyethylene-polyoxypropylene mono-ol having a molecular weight of 1803 and a weight ratio of PO units to EO units of about 50:50, wherein the PO and EO units together comprise 100% of the alkylene oxide units present in the molecule. WL-660 is predominantly primary hydroxyl terminated, and contains no other isocyanate-reactive functional groups. WL-660 is available from Huntsman International, LLC.)
2. 2.8% by weight of JEFFOL® A-800 crosslinker. (A nominal tetrol prepared by adding both PO and EO units to ethylene diamine. JEFFOL® A-800 crosslinker is believed to be essentially free of isocyanate-reactive groups other than hydroxyl groups, has an hydroxyl equivalent weight of about 70, and a molecular weight of about 280. JEFFOL® A-800 is believed to contain mostly primary hydroxyl groups, and is available from Huntsman International, LLC.)
3. 2.8% by weight of N,N-dimethyl 1-hexadecylamine (believed to be in at least 95% purity). (A fatty amine catalyst.)
4. 0.4% by weight of FOMREZ® UL-22 catalyst. (This catalyst is a proprietary organotin catalyst which is believed to comprise a dibutyltin dimercaptide compound. This catalyst is available from Crompton Corporation.)

The A-Component (13.4 g) and B-Component (100 g) were combined (these proportions of the Components by weight corresponding to an Index of 1.00 (ie. 100%)) and mixed using lab mixer at between about 50 and about 400 rpm for about 25 to 30 seconds at ambient temperature (about 20° C.). The resulting liquid reaction mixture was observed to have a low viscosity and to be homogeneous. The liquid reaction mixture was poured into a dry mold at ambient temperature and was observed to have cured to a solid gel elastomer taking the shape of the mold cavity in less than 20 minutes. At that point, the molded gel article could be handled without leaving any residue. The liquid reaction mixture was further observed to have a working time of at least 300 seconds at ambient temperature (20° C.). The system exhibited a gel time of between 6 and 6.5 minutes after completion of mixing and was demoldable and handleable at 6.5 minutes after completion of mixing.

What is claimed is:

1. A reaction system for the production of elastic polyurethane gels comprising:
   a. an isocyanate-reactive composition comprising:
      i. greater than 75% by weight of an isocyanate-reactive organic mono-ol having a molecular weight of from greater than 1500 to about 3000[1000 or greater], and
      ii. from greater than 1 to less than 10% by weight of an organic crosslinker having a nominal isocyanate-reactive group functionality of 3 or greater and an equivalent weight per isocyanate-reactive functional group of less than 150; and
   b. an organic polyisocyanate composition,
   wherein the ratio of isocyanate groups to isocyanate-reactive groups in the reaction system is between 0.70 and 1.30 and the reaction system is essentially free of isocyanate-reactive monomers or oligomers other than those present in the isocyanate-reactive composition.

2. The reaction system of claim 1, wherein the organic crosslinker consists essentially of a nominal tetrol having an isocyanate-reactive group equivalent weight of from greater than 65 to less than 80 and a molecular weight of between 200 and 350.

3. The reaction system of claim 2, wherein the nominal tetrol crosslinker consists essentially of an aliphatic amine initiated adduct formed from the reaction of an aliphatic amine with both ethylene oxide and propylene oxide.

4. The reaction system of claim 1, wherein the reaction system further comprises a fatty tertiary amine catalyst containing an alkyl or alkenyl group of greater than 10 carbon atoms and is essentially free of isocyanate-reactive groups.

5. The reaction system of claim 4, wherein the reaction system further comprises an organotin catalyst.

6. A process for preparing an elastic polyurethane gel comprising the steps of:
   a. providing a reaction system comprising:
      i. an isocyanate-reactive composition comprising:
         a. greater than 75% by weight of an isocyanate-reactive organic mono-ol having a molecular weight of [1000 or greater]from greater than 1500 to about 3000, and
         b. from greater than 1 to less than 10% by weight of an organic crosslinker having a nominal isocyanate-reactive group functionality of 3 or greater and an equivalent weight per isocyanate-reactive functional group of less than 150; and
      ii. an organic polyisocyanate composition,
      wherein the reaction system is essentially free of isocyanate-reactive monomers or oligomers other than those present in said isocyanate-reactive composition;
   b. forming an intermediate liquid reaction mixture by mixing the components of the reaction system in proportions suitable for the formation of an elastic polyurethane gel; and
   c. allowing the intermediate reaction mixture to cure under conditions suitable for the formation of an elastic polyurethane gel.

7. The process of claim 6, wherein the intermediate liquid reaction mixture is brought into contact with a material and allowed to cure under conditions suitable for the formation of an elastic polyurethane gel that is at least partially bonded to the material.

8. An elastic polyurethane gel comprising the reaction product of a reaction system comprising:
   a. an isocyanate-reactive composition comprising:
      i. greater than 75% by weight of an isocyanate-reactive organic mono-ol having a molecular weight of [1000 or greater]from greater than 1500 to about 3000, and
      ii. from greater than 1 to less than 10% by weight of an organic crosslinker having a nominal isocyanate-reactive group functionality of 3 or greater and an equivalent weight per isocyanate-reactive functional group of less than 150; and b. an organic polyisocyanate composition, wherein the ratio of isocyanate groups to isocyanate-reactive groups in the reaction system is between 0.70 and 1.30 and the reaction system is essentially free of isocyanate-reactive monomers or oligomers other than those present in the isocyanate-reactive composition.

9. The elastic polyurethane gel of claim 8, wherein the organic crosslinker consists essentially of a nominal tetrol having an isocyanate-reactive group equivalent weight of from greater than 65 to less than 80 and a molecular weight of between 200 and 350.

10. The elastic polyurethane gel of claim 9, wherein the nominal tetrol crosslinker consists essentially of an aliphatic amine initiated adduct formed from the reaction of an aliphatic amine with both ethylene oxide and propylene oxide.

11. The elastic polyurethane gel of claim 8, wherein the reaction system further comprises a fatty tertiary amine catalyst containing an alkyl or alkenyl group of greater than 10 carbon atoms and is essentially free of isocyanate-reactive groups.

12. The elastic polyurethane gel of claim 1, wherein the reaction system further comprises an organotin catalyst.

* * * * *